United States Patent
Bychkov

(10) Patent No.: US 9,762,854 B2
(45) Date of Patent: *Sep. 12, 2017

(54) DECENTRALIZED SYSTEM AND METHOD FOR VOICE AND VIDEO SESSIONS

(71) Applicant: Google Inc., Mountain View, CA (US)

(72) Inventor: Eyal Bychkov, Hod Hasharon (IL)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/745,405

(22) Filed: Jun. 20, 2015

(65) Prior Publication Data

US 2015/0288922 A1    Oct. 8, 2015

Related U.S. Application Data

(63) Continuation of application No. 13/895,396, filed on May 16, 2013, now Pat. No. 9,083,846, which is a continuation of application No. 13/101,358, filed on May 5, 2011, now Pat. No. 8,457,118.

(60) Provisional application No. 61/345,318, filed on May 17, 2010.

(51) Int. Cl.
*H04N 7/14* (2006.01)
*H04M 1/253* (2006.01)
(Continued)

(52) U.S. Cl.
CPC .......... *H04N 7/148* (2013.01); *H04M 1/2535* (2013.01); *H04M 1/7253* (2013.01);
(Continued)

(58) Field of Classification Search
CPC combination set(s) only.
See application file for complete search history.

(56) References Cited

U.S. PATENT DOCUMENTS

| 5,625,673 A | 4/1997 | Grewe et al. |
| 5,628,055 A | 5/1997 | Stein |

(Continued)

FOREIGN PATENT DOCUMENTS

| EP | 1871075 | 12/2007 |
| WO | WO-9421058 | 9/1994 |

(Continued)

OTHER PUBLICATIONS

"Non-Final Office Action", U.S. Appl. No. 13/101,358, Jan. 9, 2013, 9 pages.

(Continued)

*Primary Examiner* — Joseph J Nguyen
*Assistant Examiner* — Phung-Hoang J. Nguyen
(74) *Attorney, Agent, or Firm* — Colby Nipper PLLC

(57) ABSTRACT

A video communication apparatus is described, which includes a receiver for receiving video data from an internet telephony service over a communication channel, a display screen for playing the received video data received by the receiver, a wireless module for communication with a handset, and a processor configured to coordinate playing of the received video data on the display screen in synchronization with playing, by the handset, of audio data received by the handset from the internet telephony service. A handset is also described, which includes a receiver to receive audio data from an internet telephony service over a communication channel, an audio output to play the received audio data received by the receiver, a wireless module to communicate with a display device, and a processor. The processor can synchronize, using the wireless module, play of the received audio data on the audio output with display, by the display device, of video data received by the display device from the internet telephony service.

20 Claims, 5 Drawing Sheets

(51) Int. Cl.
    *H04M 1/725* (2006.01)
    *H04W 4/20* (2009.01)
    *H04W 84/18* (2009.01)
(52) U.S. Cl.
    CPC ............. *H04N 7/147* (2013.01); *H04W 4/20* (2013.01); *H04W 4/206* (2013.01); *H04W 84/18* (2013.01)

(56) References Cited

U.S. PATENT DOCUMENTS

| | | |
|---|---|---|
| 5,809,115 A | 9/1998 | Inkinen |
| 5,893,037 A | 4/1999 | Reele et al. |
| 5,907,815 A | 5/1999 | Grimm et al. |
| 6,188,917 B1 | 2/2001 | Laureanti |
| 6,201,867 B1 | 3/2001 | Koike |
| 6,243,578 B1 | 6/2001 | Koike |
| 6,285,823 B1 | 9/2001 | Saeki et al. |
| 6,300,947 B1 | 10/2001 | Kanevsky |
| 6,477,357 B1 | 11/2002 | Cook |
| 6,516,202 B1 | 2/2003 | Hawkins et al. |
| 6,640,113 B1 | 10/2003 | Shim et al. |
| 6,690,947 B1 | 2/2004 | Tom |
| 6,760,415 B2 * | 7/2004 | Beecroft ............. H04M 1/6033 348/E5.099 |
| 6,834,192 B1 * | 12/2004 | Watanabe ............. H04W 36/00 370/331 |
| 6,898,283 B2 | 5/2005 | Wycherley et al. |
| 6,907,264 B1 | 6/2005 | Sterkel |
| 6,999,792 B2 | 2/2006 | Warren |
| 7,020,704 B1 | 3/2006 | Lipscomb et al. |
| 7,085,542 B2 | 8/2006 | Dietrich et al. |
| 7,194,285 B2 | 3/2007 | Tom |
| 7,194,752 B1 | 3/2007 | Kenyon et al. |
| 7,266,391 B2 | 9/2007 | Warren |
| 7,275,244 B1 | 9/2007 | Charles et al. |
| 7,477,919 B2 | 1/2009 | Warren |
| 7,515,937 B2 | 4/2009 | Lee |
| 7,571,014 B1 | 8/2009 | Lambourne et al. |
| 7,747,338 B2 | 6/2010 | Korhonen et al. |
| 7,784,065 B2 | 8/2010 | Polivy et al. |
| 8,316,308 B2 | 11/2012 | Sherman |
| 8,457,118 B2 | 6/2013 | Bychkov |
| 8,463,875 B2 | 6/2013 | Katz et al. |
| 9,083,846 B2 | 7/2015 | Bychkov |
| 9,448,814 B2 | 9/2016 | Sherman et al. |
| 9,686,145 B2 | 6/2017 | Sherman et al. |
| 2001/0055951 A1 | 12/2001 | Slotznick |
| 2002/0090980 A1 | 7/2002 | Wilcox et al. |
| 2002/0151327 A1 | 10/2002 | Levitt |
| 2003/0008563 A1 | 1/2003 | Nishio et al. |
| 2003/0107529 A1 | 6/2003 | Hayhurst et al. |
| 2003/0200001 A1 | 10/2003 | Goddard |
| 2004/0042601 A1 * | 3/2004 | Miao ............. H04M 3/567 379/202.01 |
| 2004/0052501 A1 | 3/2004 | Tam |
| 2004/0156616 A1 | 8/2004 | Strub et al. |
| 2004/0233930 A1 | 11/2004 | Colby |
| 2005/0064860 A1 * | 3/2005 | DeLine ............. G08C 17/02 455/420 |
| 2005/0070225 A1 | 3/2005 | Lee |
| 2005/0091359 A1 | 4/2005 | Soin et al. |
| 2005/0159184 A1 | 7/2005 | Kerner et al. |
| 2005/0231392 A1 | 10/2005 | Meehan et al. |
| 2005/0276570 A1 | 12/2005 | Reed et al. |
| 2005/0276750 A1 | 12/2005 | Ziv et al. |
| 2006/0003804 A1 | 1/2006 | Liu |
| 2006/0026652 A1 | 2/2006 | Pulitzer |
| 2006/0033809 A1 | 2/2006 | Farley |
| 2006/0072694 A1 | 4/2006 | Dai et al. |
| 2006/0075439 A1 * | 4/2006 | Vance ............. H04L 29/06027 725/81 |
| 2006/0105722 A1 | 5/2006 | Kumar |
| 2006/0123053 A1 | 6/2006 | Scannell |
| 2006/0130075 A1 | 6/2006 | Rhoten et al. |
| 2006/0190321 A1 | 8/2006 | Martins Nicho et al. |
| 2006/0235872 A1 | 10/2006 | Kline et al. |
| 2006/0241353 A1 | 10/2006 | Makino et al. |
| 2006/0242590 A1 | 10/2006 | Polivy et al. |
| 2007/0004450 A1 | 1/2007 | Parikh |
| 2007/0018957 A1 | 1/2007 | Seo |
| 2007/0053653 A1 | 3/2007 | Huntington |
| 2007/0072589 A1 | 3/2007 | Clarke |
| 2007/0079030 A1 | 4/2007 | Okuley et al. |
| 2007/0139514 A1 * | 6/2007 | Marley ................. H04N 7/147 348/14.01 |
| 2007/0161404 A1 | 7/2007 | Yasujima et al. |
| 2007/0195158 A1 * | 8/2007 | Kies ..................... H04L 65/604 348/14.01 |
| 2007/0211907 A1 | 9/2007 | Eo et al. |
| 2007/0226734 A1 | 9/2007 | Lin |
| 2007/0288583 A1 | 12/2007 | Rensin et al. |
| 2008/0009325 A1 | 1/2008 | Zinn et al. |
| 2008/0013659 A1 | 1/2008 | Kim |
| 2008/0013802 A1 | 1/2008 | Lee et al. |
| 2008/0019522 A1 * | 1/2008 | Proctor ................. H04W 4/06 380/255 |
| 2008/0026794 A1 | 1/2008 | Warren |
| 2008/0030304 A1 | 2/2008 | Doan et al. |
| 2008/0037674 A1 | 2/2008 | Zurek et al. |
| 2008/0040354 A1 | 2/2008 | Ray et al. |
| 2008/0045140 A1 | 2/2008 | Korhonen |
| 2008/0056285 A1 | 3/2008 | Quinn et al. |
| 2008/0120401 A1 | 5/2008 | Panabaker et al. |
| 2008/0140886 A1 | 6/2008 | Izutsu |
| 2008/0152165 A1 | 6/2008 | Zacchi |
| 2008/0162665 A1 | 7/2008 | Kali |
| 2008/0168368 A1 | 7/2008 | Louch et al. |
| 2008/0212649 A1 | 9/2008 | Jougit |
| 2008/0307315 A1 | 12/2008 | Sherman et al. |
| 2009/0002191 A1 | 1/2009 | Kitaura |
| 2009/0010485 A1 * | 1/2009 | Lamb ..................... H04N 7/148 382/100 |
| 2009/0158382 A1 | 6/2009 | Shaffer et al. |
| 2009/0207097 A1 | 8/2009 | Sherman et al. |
| 2009/0210491 A1 * | 8/2009 | Thakkar ............... H04L 12/1822 709/204 |
| 2009/0286570 A1 | 11/2009 | Pierce |
| 2010/0003921 A1 * | 1/2010 | Godlewski ........... H04W 76/062 455/67.11 |
| 2010/0041330 A1 | 2/2010 | Elg |
| 2010/0093401 A1 | 4/2010 | Moran et al. |
| 2010/0305729 A1 | 12/2010 | Glitsch et al. |
| 2011/0047247 A1 | 2/2011 | Katz et al. |
| 2011/0164105 A1 * | 7/2011 | Lee ......................... H04N 7/142 348/14.02 |
| 2011/0208807 A1 * | 8/2011 | Shaffer .................. G06F 3/0418 709/203 |
| 2011/0280142 A1 | 11/2011 | Bychkov |
| 2012/0314777 A1 * | 12/2012 | Zhang ............... H04N 21/43632 375/240.26 |
| 2013/0036366 A1 | 2/2013 | Sherman et al. |
| 2013/0258038 A1 | 10/2013 | Bychkov |

FOREIGN PATENT DOCUMENTS

| | | |
|---|---|---|
| WO | WO-0059247 | 10/2000 |
| WO | WO-0186922 | 10/2001 |
| WO | WO-03103174 | 12/2003 |
| WO | WO-2008011230 | 1/2008 |

OTHER PUBLICATIONS

"Non-Final Office Action", U.S. Appl. No. 13/895,396, Nov. 20, 2014, 11 pages.

"Non-Final Office Action", U.S. Appl. No. 13/895,396, Dec. 16, 2014, 8 pages.

"Notice of Allowance", U.S. Appl. No. 13/101,358, Feb. 19, 2013, 8 pages.

"Notice of Allowance", U.S. Appl. No. 13/895,396, Mar. 19, 2015, 10 pages.

(56) References Cited

OTHER PUBLICATIONS

"Advisory Action", U.S. Appl. No. 12/372,812, Nov. 29, 2012, 3 pages.
"Final Office Action", U.S. Appl. No. 12/372,812, Feb. 10, 2015, 14 pages.
"Final Office Action", U.S. Appl. No. 12/372,812, Aug. 28, 2012, 14 pages.
"Final Office Action", U.S. Appl. No. 12/850,804, Jan. 10, 2013, 13 pages.
"Non-Final Office Action", U.S. Appl. No. 12/134,221, Nov. 15, 2011, 8 pages.
"Non-Final Office Action", U.S. Appl. No. 12/372,812, Jun. 13, 2014, 11 pages.
"Non-Final Office Action", U.S. Appl. No. 12/372,812, Dec. 22, 2011, 9 pages.
"Non-Final Office Action", U.S. Appl. No. 12/850,804, Oct. 26, 2012, 12 pages.
"Non-Final Office Action", U.S. Appl. No. 13/612,879, Oct. 22, 2015, 9 pages.
"Non-Final Office Action", U.S. Appl. No. 13/887,450, Jul. 8, 2015, 10 pages.
"Notice of Allowance", U.S. Appl. No. 12/134,221, Jul. 25, 2012, 7 pages.
"Notice of Allowance", U.S. Appl. No. 12/850,804, Feb. 6, 2013, 12 pages.
"Restriction Requirement", U.S. Appl. No. 12/134,221, Aug. 2, 2011, 6 pages.
"Restriction Requirement", U.S. Appl. No. 12/372,812, Sep. 30, 2011, 9 pages.
"Restriction Requirement", U.S. Appl. No. 12/850,804, Oct. 3, 2012, 5 pages.
"Restriction Requirement", U.S. Appl. No. 13/612,879, Sep. 9, 2015, 6 pages.
"Final Office Action", U.S. Appl. No. 13/887,450, Feb. 25, 2016, 10 pages.
"Notice of Allowance", U.S. Appl. No. 12/372,812, Jun. 13, 2016, 5 pages.
"Final Office Action", U.S. Appl. No. 13/612,879, Apr. 26, 2016, 9 pages.
"Non-Final Office Action", U.S. Appl. No. 13/612,879, Sep. 20, 2016, 11 pages.
"Non-Final Office Action", U.S. Appl. No. 13/887,450, Jan. 13, 2017, 11 pages.
"Foreign Office Action", EP Application No. 11783165.1, Jan. 13, 2017, 5 pages.
"Notice of Allowance", U.S. Appl. No. 13/612,879, Feb. 10, 2017, 7 pages.
"Supplementary European Search Report", EP Application No. 10809633.0, dated Apr. 24, 2017, 7 pages.

\* cited by examiner

DECENTRALIZED SYSTEM AND METHOD FOR VOICE AND VIDEO SESSIONS

CROSS REFERENCES TO RELATED APPLICATIONS

This application claims benefit to, and is a continuation of, U.S. patent application Ser. No. 13/895,396, entitled DECENTRALIZED SYSTEM AND METHOD FOR VOICE AND VIDEO SESSIONS, filed on May 16, 2013 by inventor Eyal Bychkov. U.S. patent application Ser. No. 13/895,396 is a continuation of U.S. patent application Ser. No. 13/101,358, now U.S. Pat. No. 8,457,118, entitled DECENTRALIZED SYSTEM AND METHOD FOR VOICE AND VIDEO SESSIONS, filed on May 5, 2011 by inventor Eyal Bychkov. U.S. patent application Ser. No. 13/101,358 is a non-provisional of U.S. Provisional Application No. 61/345,318, entitled DECENTRALIZED SYSTEM AND METHOD FOR VOICE AND VIDEO SESSIONS, filed on May 17, 2010 by inventor Eyal Bychkov.

FIELD OF THE INVENTION

The present invention is directed to Voice and Video conversations Over IP, and more particularly to a method and system for making such communications using a decentralized architecture.

BACKGROUND OF THE INVENTION

There are numerous devices and applications which are based on transferring Voice and/or Video over IP (Internet Protocol). These include having VOIP clients on a PC, or installed on any other communication device, such as a mobile phone. There are also dedicated Wi-Fi telephones which support VOIP applications; VOIP telephones can be both wired, such as the Cisco CP-7941G, or wireless, such as the Polycom SPECTRALINK® 8002 2200-37010-020 or Linksys WIP310-G1.

Client devices for making and receiving voice and video calls over the IP network with the standard functionality of most "original" telephones are also referred to as "softphones". Softphones usually allow integration with IP phones and USB phones instead of utilizing a computer's microphone and speakers (or headset). Often a softphone is designed to behave like a traditional telephone, sometimes appearing as an image of a phone, with a display panel and buttons with which the user can interact.

A typical application of a softphone is to make calls via an Internet telephony service provider to other softphones or to telephones. Popular Internet telephony service providers include SKYPE®, GOOGLE TALK™, and VONAGE®, which have their own softphones that a user may install on his computer or the like. Most service providers use a communication protocol called SIP (Session Initiation Protocol), whereas SKYPE® has a closed proprietary system. In order to make a voice call over the internet, one should have any computing device with an audio input (e.g. microphone) and output means (e.g. a speaker or headset), Internet connectivity such as DSL, Wi-Fi, cable or LAN, and an account with an Internet telephony service provider or IP PBX.

Such prior art devices establish a single connection to the Internet telephony service provider.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate generally to Voice and Video over IP. In particular, aspects of the present invention relate to a system and method for communication where there is more than one terminal for conducting and controlling the VoIP sessions.

Figure 1:
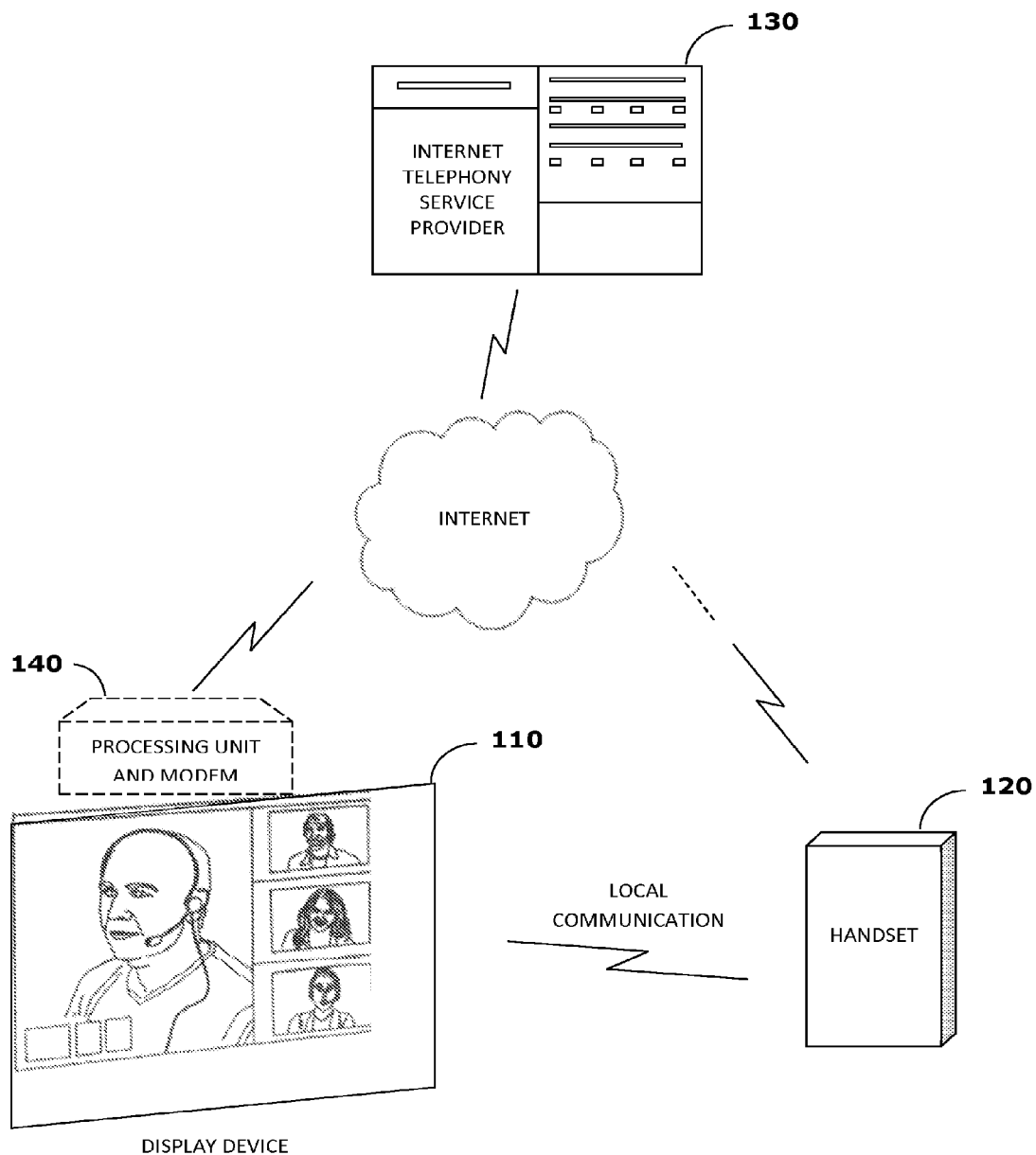
FIG. 1 is a simplified block diagram of the VOIP system, in accordance with an embodiment of the present invention.

Reference is now made to FIG. 1, which is a simplified block diagram of the system according to an embodiment of the present invention. The system includes a display 110 (referred to hereinafter as the Display) and a handset 120 (referred to hereinafter as the Handset). The Display may be inter alia a PC display, an LCD screen, a Plasma Display Panel, an LED panel, a Digital Picture Frame (DPF) device and any other display or device having a display. The Handset is typically a mobile electronic device, which communicates with the Display via local communication means. The local communication may be inter alia BLUETOOTH®, Infra-Red (IR), Wi-Fi or any other Near Field Communication means. Both Display 110 and Handset 120 are capable of communicating with Internet Telephony Service Provider 130 via the internet. Display 110 may include a modem and processing means (such as a PC or laptop computer which includes both the display and the CPU and modem) or may be connected to a separate processing unit and modem 140. Display 110 may also include or be connected to a processing unit which in turn is connected wirelessly to a router and a modem, for connecting to the internet. Handset 120 may be connected wirelessly to a router which is connected to the internet, or may be connected to the internet via any network (3G, GPRS, etc.) using any known in the art standard (e.g. WAP). According to another embodiment of the present invention, Handset 120 may even be connected to the internet via local connection to Display 110, which is connected to the internet in any of a few ways, as described hereinabove.

According to an embodiment of the present invention, a softphone application is installed and operates on both Display 110 and Handset 120, which are synced so as to provide a seamless experience to the user. A typical scenario includes a user having the Handset 120 close to him, possibly in his hands, whereas Display 110 is a few meters away, such as when Display 110 is an LCD display in the living room. Therefore such a scenario or similar scenarios would benefit from a decentralized system and method for providing Voice over IP or Voice and Video over IP sessions. According to an embodiment of the present invention, the controlling of such VoIP sessions is done from Handset 120; e.g. initiating calls to contacts, answering calls, ending calls, etc.

According to an embodiment of the present invention, both Display 110 and Handset 120 have audio and video capabilities, as shown in Table 1 below. Display 110 includes audio input means (e.g. built-in microphone, or such that is connected to the processing unit and modem 140), audio output (speakers), video input (built-in camera or such that is connected to the processing unit and modem 140) and video output (the display). Handset 120 includes audio input means (microphone), audio output means (earpiece and/or speakers and or headsets), and video output means (display) and according to an embodiment of the present invention may also include video input means (built-in or attachable camera).

TABLE 1

|  | Display 110 | Handset 120 |
| --- | --- | --- |
| Audio input | Built-in microphone or microphone attached to processing unit and modem 140 | Built-in microphone |
| Audio output | Speakers | earpiece and/or speakers and or headsets |
| Video input | Built-in camera or attached to processing unit and modem 140 | Built-in or attachable camera |
| Video output | Display | Display |

Figure 2:
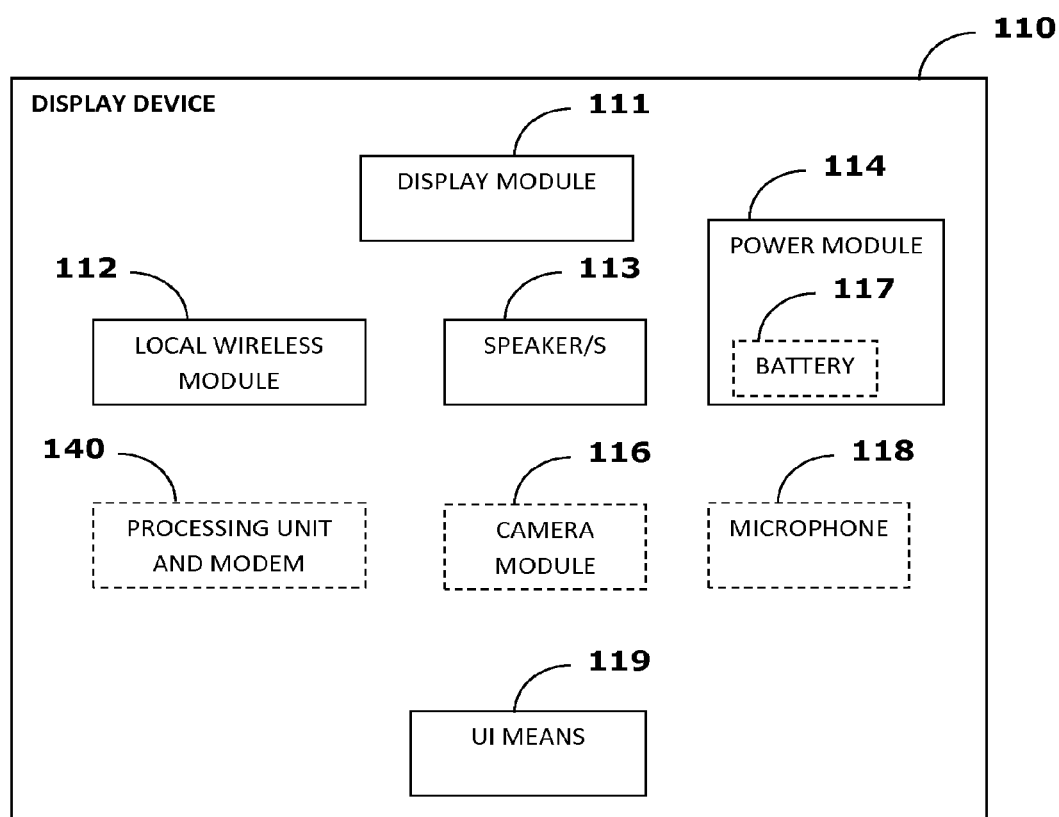
FIG. 2 is a simplified block diagram of the Display, in accordance with an embodiment of the present invention.

Reference is now made to FIG. 2, which is a simplified block diagram of Display 110, according to an embodiment of the present invention. Display 110 includes display module 111, which includes any display technology, such as LCD, Plasma, LED, OLED, Bi-Stable or any other. for example, for an LCD module, display module 111 typically includes LCD Controller, LCD driver and LCD glass. Display 110 also includes local wireless module 112 for communicating with Handset 120. Display 110 further includes speaker or speakers 113 and power module 114, which may consist of a power outlet and/or optionally battery 117. Display 110 optionally includes processing unit and modem 140, which may alternatively be connected externally to Display 110. Display 110 optionally includes camera module 116, which functions as video input to Display 110. Display 110 may optionally also include a microphone 118, which serves as audio input. Microphone may also be an external component. Display 110 also includes UI (user-interface) means 119 for operating Display 110. UI means 119 may be keypad, button/s, touchscreen, or any other UI method known in the art.

Figure 3:
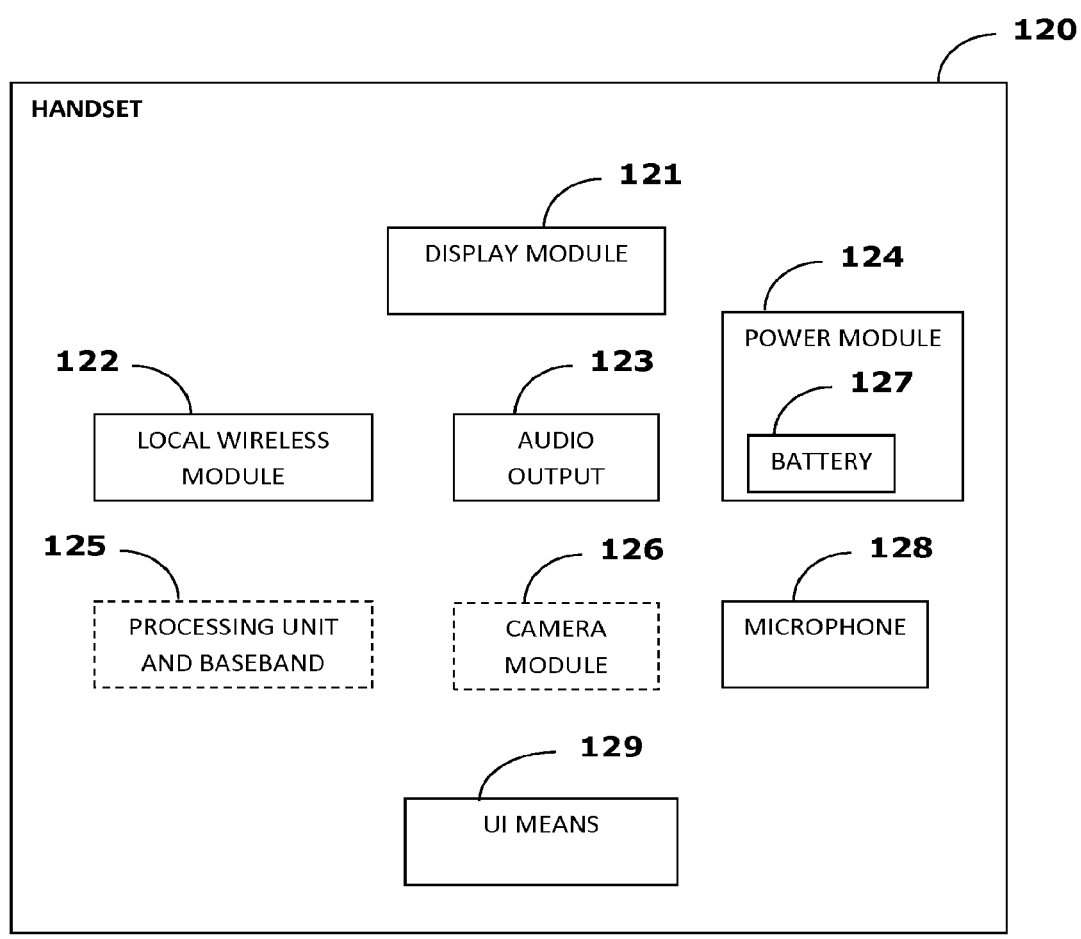
FIG. 3 is a simplified block diagram of the Handset, in accordance with an embodiment of the present invention.

Reference is now made to FIG. 3, which is a simplified block diagram of Handset 120, according to an embodiment of the present invention. Handset 120 includes display module 121, which includes any display technology used for small mobile devices, such as LCD, LED, OLED, Bi-Stable or any other. Handset 120 also includes local wireless module 122 for communicating with Display 110. Said module 122 may be Bluetooth, IR, Wi-Fi, NFC or any wireless module. Handset 120 further includes AUDIO OUTPUT MEANS 123, which may include earpiece and/or speakers and or headsets. Handset 120 also includes power module 124, which typically consists of a power outlet and battery 127. Handset 120 optionally includes processing unit and baseband 125, in which case Handset 120 serves as a mobile communication device, such as a mobile cellular phone. If Handset 120 is a mobile cellular phone, it may include further components known in the art, such as Antenna. Handset 120 optionally includes camera module 126, which functions as video input to Handset 120. Handset 120 also includes a microphone 128, which serves as audio input. Handset 120 also includes UI (user-interface) means 129 for operating Handset 120. UI means 129 may be keypad, button/s, touchscreen, or any other UI method known in the art.

According to a preferred embodiment of the present invention, since Handset 120 is typically in great vicinity to the user, it is used as the audio input of a conversation. The audio out may be either the audio output means of Display 110 or that of Handset 120; video output is preferably the display of Display 110, and video input may be either video input means of Display 110 or Handset 120.

According to another embodiment of the present invention, audio and video input and output means may be used concurrently. E.g., both audio output of Display 110 and that of Handset 120 may play the audio of the active conversation.

Figure 4:
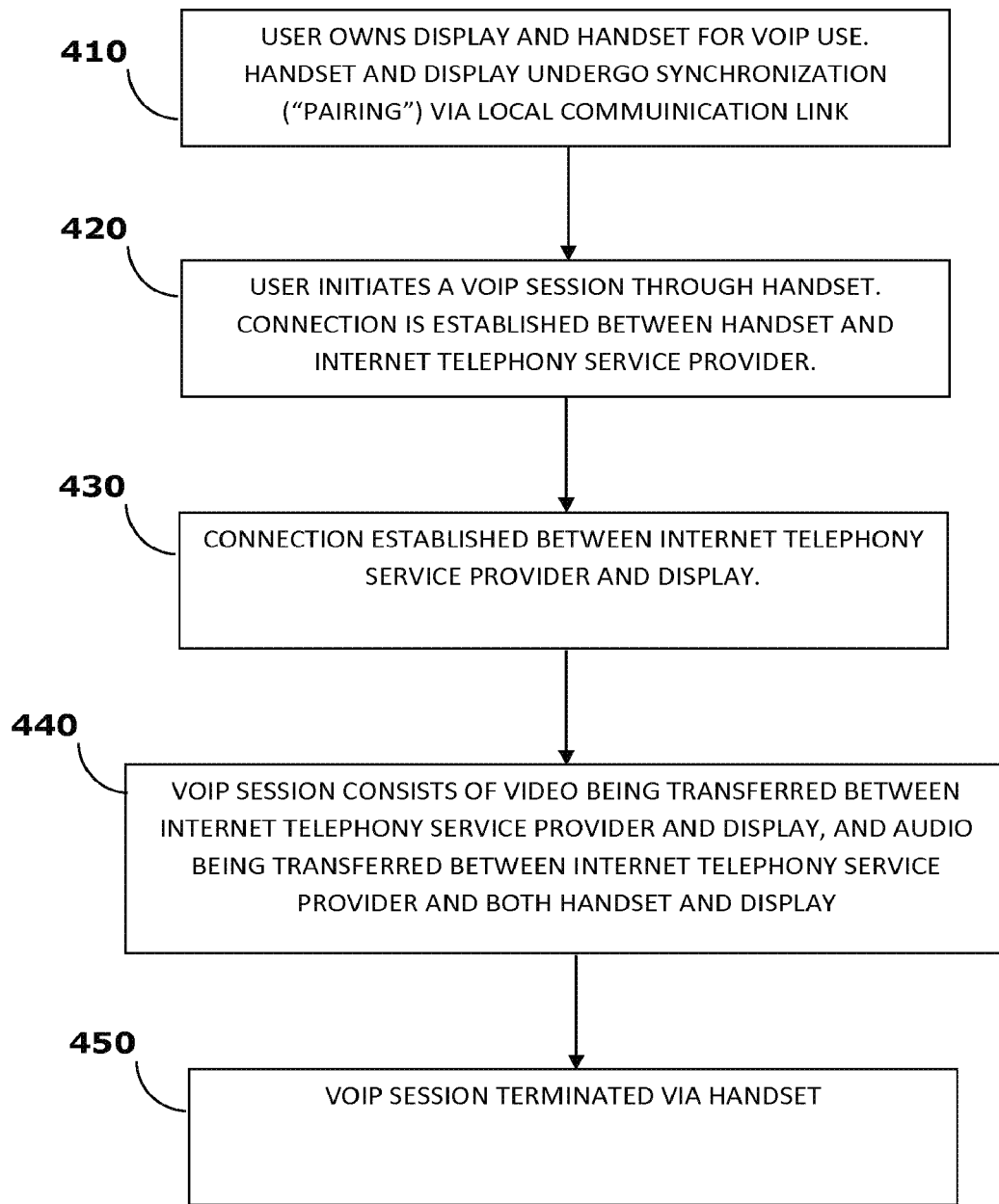
FIG. 4 is a simplified flowchart of a method for conducting a VOIP conversation, in accordance with an embodiment of the present invention.

Reference is now made to FIG. 4, which is a simplified flowchart of a method for conducting a VOIP conversation, in accordance with an embodiment of the present invention. At step 410, Display 110 and Handset 120 of user are in close proximity and are paired. Such pairing may be pairing procedure known in the art, for example Bluetooth pairing. In addition, said pairing may be initiated manually by user, via Handset 120. At step 420, user initiates a VoIP session through Handset 120, which is typically carried by hand. VoIP session may be, for example, a video call. Handset 110 connects to internet telephony service provider 130, to perform the conversation.

Step 430 occurs concurrently or immediately follows step 420. At step 430, a second connection is established between internet telephony service provider 130 and Display 110. According to an embodiment of present invention, said second connection is initiated by Display 110, which contacts internet telephony service provider 130 and signal that it should join initiated or ongoing session between internet telephony service provider 130 and Handset 110. Display 110 may transfer any detail about Handset and/or session so that internet telephony service provider 130 identifies session and can transfer the session or parts of it (e.g. video) to Display 110. According to another embodiment of the present invention, Handset 120 signals to internet telephony service provider 130 that it is paired to Display 110, and therefore the initiated VoIP session should be shared with Display 110.

Said second connection between Display 110 and Internet telephony service provider 130 is typically established for video purposes, whereas according to an embodiment of the present invention, video of said VoIP session is transferred between internet telephony service provider 130 and Display 110, and audio is transferred between internet telephony service provider 130 and both Handset 120 and Display 110.

Display 110 typically has a larger display than Handset 120, more convenient for user viewing, and possibly better speakers, and in addition connection between Display 110 and internet telephony service provider 130 is of higher band width, as compared to connection between Handset 120 and internet telephony service provider 130. Therefore, at step 440, the video part of the VoIP session, which is more band-width consuming, is transferred between Display 110 and internet telephony service provider 130, and the audio part is transferred between internet telephony service provider 130 and both Display 110 and Handset 120. Handset 110 is especially used for audio input of the VoIP session, whereas the audio output may be played through audio output means of Handset 110, Display 120, or both. At step 450, user terminates VoIP session via Handset 120.

According to an aspect of the current invention, even though the VoIP session is divided between two connections, the session is seamless and the user carries out the conversation as if it were a single connection. Accordingly, there is synchronization between Display 110 and Handset 120. Said synchronization is used in diminishing latencies between audio and video, and between Display 110 and Handset 120. The video received and displayed on Display 110 is synchronized with the audio received and played on either speaker/s 113 of Display 110 or audio output means 123 of Handset 120. Synchronization between Display 110 and Handset 120 is performed either via internet telephony service provider 130 or directly. In a first embodiment of the present invention, a time stamp is sent from both Display 110 and Handset 120 to internet telephony service provider 130. The internet telephony service provider 130 in turn alters transmission time of data, audio and/or video, to Display 110 and Handset 120. According to a second embodiment of the present invention, Display 110 and Handset 120 may have buffers which allow them to synchronize between Display 110 and Handset 120, by delaying playing/sending of data to internet telephony service provider 130.

According to an embodiment of the present invention, Handset 120 is also used to control other elements in Display 110, using local communication channel, which is established by local wireless modules 112 and 122. For example, Handset 120 may act as a remote control to Display 110.

According to yet another embodiment of the present invention, the system includes multiple Displays, similar to Display 110. Handset 120 communicates with all Displays, and may control a session which is divided between Handset 120 and a first Display 120 and upon manual selection by the user, or automatically, session may be handed-over to be divided between Handset 120 and second Display 110. Hand-over between first Display 110 and second Display 110 is initiated manually by user, who may be able to see which other Displays are in his vicinity. In another embodiment of the present invention, the session may be handed over automatically, possibly when user moves from first location to second location, and/or when local communication between Handset 120 and said second Display 110 is typically of better quality than that between Handset 120 and said first Display 110. Such handover mechanisms are described in the art, for example, U.S. Pat. No. 6,834,192 to Watanabe et al., which describes handover of communications in a Bluetooth, or other, radio communication system, or U.S. patent application Ser. No. 11/680,911 to Jougit, describing a method and system for a distributed Bluetooth host architecture.

Figure 5:
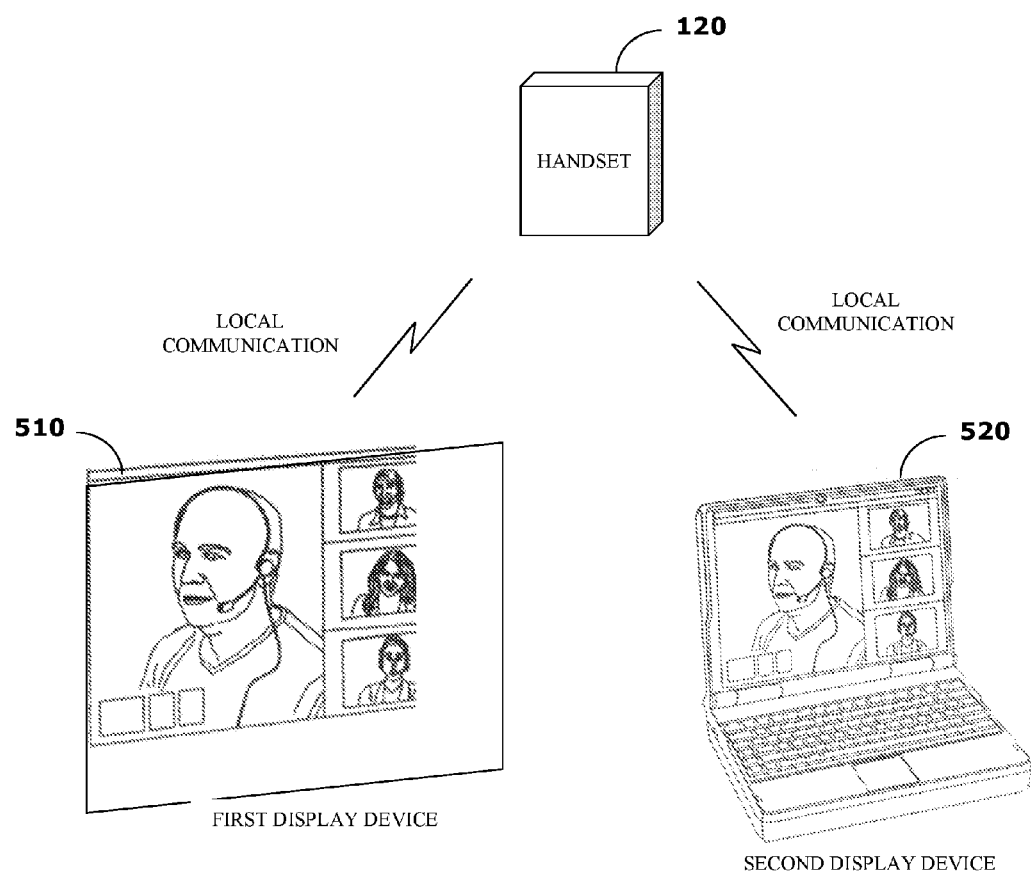
FIG. 5 is a simplified block diagram of the VOIP system, in accordance with an embodiment of the present invention.

Reference is now made to FIG. 5, which is a simplified block diagram of the system according to an embodiment of the present invention. Handset 120 may be paired with first Display 510 or second Display 520, which may be any Display 110, as described above.

What is claimed is:

1. A video communication apparatus, comprising:
a receiver to receive video data for a video call from an internet telephony service over a first communication channel, the video call being divided into the received video data and audio data, the received video data comprising a video component of the video call and the audio data comprising an audio component of the video call;
a display screen to display the received video data;
a wireless module for communication with a handset, the handset being separate from the receiver and configured to receive the audio data of the video call from the internet telephony service over a second communication channel;
a buffer; and
a processor to synchronize, using the wireless module, display of the received video data on the display screen with play, by the handset, of the received audio data, the received video data and the received audio data for a same video call, the processor configured to transmit information about the handset to the internet telephony service in order for the internet telephony service to identify the same video call and enable the video communication apparatus and the handset to join the same video call, the processor configured to delay the display of the received video data using the buffer or delay the play of the received audio data at the handset.

2. The apparatus of claim 1 further comprising an audio output component, and wherein the processor is further configured to also receive the audio data over the first communication channel and to play the received audio data on the audio output component.

3. The apparatus of claim 1, wherein the wireless module communicates with the handset via a local communication channel, and wherein the local communication channel comprises WiFi, Bluetooth, infrared, or near field communication.

4. The apparatus of claim 3, wherein the handset is further configured to control elements of the video communication apparatus via the local communication channel.

5. The apparatus of claim 1, further comprising an audio input means, wherein the audio input means is configured to receive another audio data, the other audio data being returned to the internet telephony service as part of the same video call.

6. The apparatus of claim 1, further comprising a video input means, wherein the video input means is configured to receive another video data, the other video data being returned to the internet telephony service as part of the same video call.

7. The apparatus of claim 1, wherein the second communication channel comprises a cellular telephone network.

8. The apparatus of claim 1 further comprising an additional display screen, wherein the processor is further configured to hand-over the video data from the display screen to the additional display screen.

9. The apparatus of claim 8, wherein the hand-over of the video data from the display screen to the additional display screen coincides with a move of the handset from a first location to a second location.

10. The apparatus of claim 1, wherein the first communication channel is of a higher band width than the second communication channel.

11. A handset, comprising:
a receiver to receive audio data for a video call from an internet telephony service over a first communication channel, the video call being divided into video data and the received audio data, the video data comprising a video component of the video call and the received audio data comprising an audio component of the video call;
an audio output to play the received audio data;
a wireless module for communication with a display device, the display device being separate from the receiver and configured to receive the video data of the video call from the internet telephony service over a second communication channel;
a buffer; and
a processor to synchronize, using the wireless module, play of the received audio data on the audio output with display, by the display device, of the received video data, the received video data and the received audio data for a same video call, the processor configured to transmit information about the display device to the internet telephony service in order for the internet telephony service to identify the same video call and enable the handset and the display device to join the same video call, the processor configured to delay play of the received audio data using the buffer or delay the display of the received video data at the display device.

12. The handset of claim 11, wherein the wireless module communicates with the display device via a local communication channel, and wherein the local communication channel comprises WiFi, Bluetooth, infrared, or near field communication.

13. The handset of claim 12, wherein the handset is further configured to communicate with the internet telephony service via the local communication channel and the display device.

14. The handset of claim 11, further comprising a display, and wherein the processor is further configured to also receive the video data over the first communication channel and to display the received video data on the display.

15. The handset of claim 11, further comprising an audio input means, wherein the audio input means is configured to receive another audio data, the other audio data being returned to the internet telephony service as part of the same video call.

16. The handset of claim 11, further comprising a video input means, wherein the video input means is configured to receive another video data, the other video data being returned to the internet telephony service as part of the same video call.

17. The handset of claim 11, wherein the first communication channel comprises a cellular telephone network.

18. The handset of claim 11, further comprising an additional display device, wherein the processor is further configured to hand-over the video data from the display device to the additional display device.

19. The handset of claim 18, wherein the hand-over of the video data from the display device to the additional display device coincides with a move of the handset from a first location to a second location.

20. The handset of claim 11, wherein the handset is further configured to initiate the video call.

* * * * *